United States Patent [19]
Bach

[11] 3,724,332
[45] Apr. 3, 1973

[54] PRESSURE LIMITER FOR HYDRAULIC BOOSTER

[75] Inventor: Lloyd Gene Bach, South Bend, Ind.

[73] Assignee: The Bendix Corporation, South Bend, Ind.

[22] Filed: Feb. 10, 1972

[21] Appl. No.: 225,060

[52] U.S. Cl..................91/391 R, 91/434, 60/54.6 P, 91/469
[51] Int. Cl........F15b 7/00, F15b 13/10, F15b 13/14
[58] Field of Search ......60/54.5 P, 54.6 P; 91/391 R, 91/434, 469

[56] References Cited

UNITED STATES PATENTS

| 2,766,732 | 10/1956 | Schultz | 60/546 P |
|---|---|---|---|
| 1,952,690 | 3/1934 | Strom | 91/434 |
| 3,677,140 | 7/1972 | Brown | 91/391 R |
| 3,688,498 | 9/1972 | Back et al. | 91/391 R |

Primary Examiner—Martin P. Schwadron
Assistant Examiner—A. M. Zupcic
Attorney—Ken C. Decker et al.

[57] ABSTRACT

A pressure limiting device for a hydraulic brake booster is disclosed which limits the fluid pressure level in the pressure chamber of the booster to a predetermined maximum level. The pressure limiter includes a differential pressure responsive piston which shifts into engagement with the end of the spool valve used to control communication between the booster pressure chamber and a pressure source when the pressure level in the pressure chamber attains the predetermined maximum value. After the piston engages the end of the spool valve, the latter may not be shifted further from the brake release position to admit higher fluid pressures into the pressure chamber.

9 Claims, 2 Drawing Figures

PRESSURE LIMITER FOR HYDRAULIC BOOSTER

BACKGROUND OF THE INVENTION

Hydraulic brake boosters are expected to be used in lieu of existing vacuum boosters in vehicles having power assisted brakes in the near future. One advantage of hydraulic brake boosters is the much higher actuating pressures which may be developed as compared to the existing vacuum units. However, these pressures may be so high that the output pressure of the vehicle's master cylinder which is actuated by the brake booster may rupture the brake lines or damage other components of the vehicle's braking system. Furthermore, the valving arrangements used in hydraulic brake boosters is designed to deliver a pressure level into the pressure chamber of the booster equal to the maximum pressure output of the vehicle's power steering pump. However, when the booster is operated at this maximum pressure level, flow of fluid to the vehicle's power steering unit may be greatly reduced, thus reducing the power assist available to vehicle operator for a steering maneuver concurrent with a brake application. Therefore, it is desirable to limit the maximum pressure level developed in the brake booster to a value below the maximum pressure output of the vehicle's power steering pump.

SUMMARY OF THE INVENTION

Therefore, an important object of my invention is to provide a device which limits the fluid pressure level in the pressure chamber of a hydraulic brake booster to a predetermined maximum.

Another important object of my invention is to insure adequate fluid flow through the brake booster to the vehicle's power steering unit to assure normal operation of the latter.

Another important object of my invention is to prevent damage to the components in the brake system of a vehicle equipped with a hydraulic brake booster.

A still further object of my invention is to provide a device which limits the pressure level in the pressure chamber of the hydraulic brake booster to a predetermined maximum independently of variations in oil temperature, power steering pump flow, or the pressure developed in the vehicle's power steering gear.

A still further important object of my invention is to provide a pressure limiting device for a hydraulic brake booster which is totally inactive or passive during operation of the booster below the predetermined fluid pressure level.

DETAILED DESCRIPTION

Figure 1:
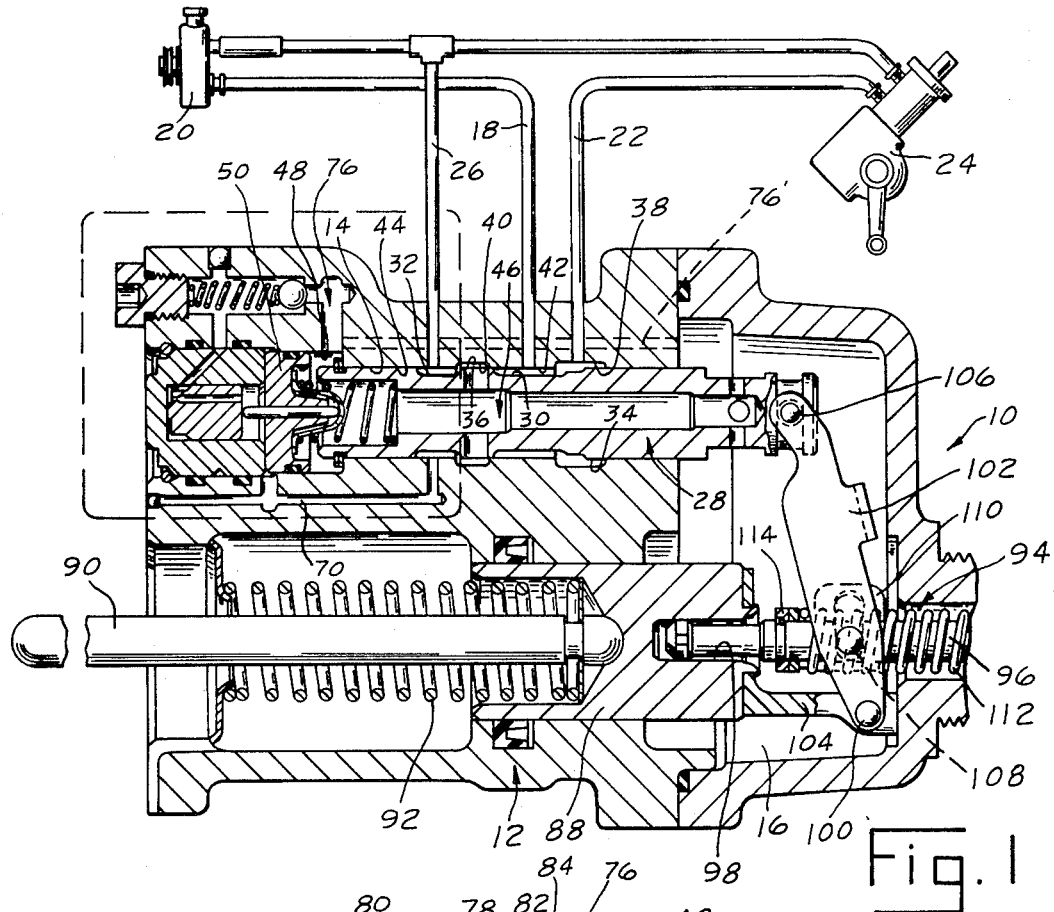
FIG. 1 is a schematic illustration of a vehicle hydraulic system with a hydraulic brake booster made pursuant to the teachings of my present invention illustrated in cross section.
Figure 2:
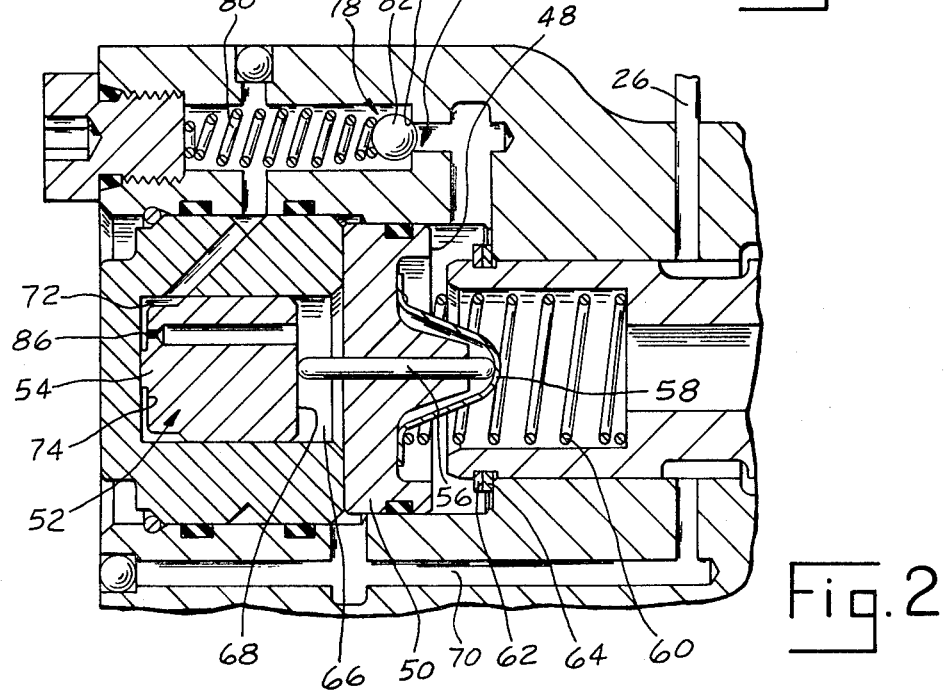
FIG. 2 is an enlarged, cross-sectional view of the circumscribed portion of FIG. 1.

Referring now to the drawings, a brake booster 10 includes a housing 12 defining a bore 14 therewithin, the end of which communicates into a pressure chamber 16. An inlet port 18 communicates the bore 14 with the outlet or high pressure side of the vehicle's power steering pump 20, and an outlet port 22 communicates the bore 14 with the inlet of the vehicle's power steering gear 24. A return or exhaust port 26 communicates the bore 14 with a reservoir (not shown) located at the inlet or low pressure side of the pump 20. The outlet or low pressure side of the power steering gear 24 is also communicated to the aforementioned reservoir. A spool valve generally indicated by the numeral 28 is slidably mounted in the bore 14 and is provided with grooves 30, 32 and lands 34 and 36 which cooperate with corresponding grooves 38, 40 and lands 42, 44 on the wall of the bore 14 to control communication between the inlet port 18, exhaust port 26 and the pressure chamber 16 in a manner to be described hereinafter. Passage means generally indicated by the numeral 46 are provided within the spool valve 28 which communicate the groove 40 with the pressure chamber 16 and with a fluid cavity 48 defined between the left hand end of the spool valve 28 (viewing FIG. 1) and a partition 50 mounted in the bore 14.

Piston means generally indicated by the numeral 52 includes a differential pressure responsive piston 54 which is slidably mounted within the bore 14, a plunger 56 extending through the partition 50 which interconnects the piston 54 to a retainer 58 mounted in the cavity 48. A spring 60 is disposed between the spool valve 28 and the retainer 58, which yieldably urges a stop ring 62 on the spool valve 28 in engagement with a shoulder 64 provided on the housing 12, to thereby define the brake released position of the spool valve 28. A first chamber 66 is defined between one face 68 of the piston 54 and the partition 50. Chamber 66 is vented to the aforementioned reservoir (not shown) by passage means 70 which communicate the chamber 66 with the groove 32 and therefore to the exhaust port 26. Another fluid chamber 72 is defined between the opposite face 74 of the piston 54 and the end of the bore 14. Passage means generally indicated by the numeral 76 communicates the chamber 72 with the fluid pressure level communicated to the pressure chamber 16. One embodiment of my invention, the passage means 76, communicates the chamber 72 directly with the pressure chamber 16. Another embodiment of my invention, the passage means 76', communicates the chamber 72 with the cavity 48. Although both passages 76 and 76' are illustrated in FIG. 1, it will, of course, be understood that the chamber 72 will be communicated to only one of the chambers 48 or 16. As will be appreciated by those skilled in the art, substantially the same fluid pressure levels exist in the cavity 48 and in the pressure chamber 16, however, transient conditions during operation of the booster may permit the pressure levels to be unequal for a brief period of time. Valve means generally indicated by the numeral 78 are provided within the passage means 76 and include a spring 80 which yieldably urges a sphere 82 into sealing engagement with a valve seating area 84 provided on the passage means 76. A flow restricting orifice 86 communicates the chamber 72 with the chamber 66 and maintains a predetermined pressure differential across the piston 54 when a relatively high fluid pressure level is communicated into the chamber 72 as will be explained hereinafter.

A boost piston 88 is slidably mounted within the housing 12, and the right hand end (viewing FIG. 1) of the latter is exposed to the fluid pressure level in the pressure chamber 16. An actuating rod 90 interconnects the piston 88 with a standard automotive master cylinder (not shown) mounted to the left of the housing 12. Therefore, movement of the piston 88 to the left (viewing FIG. 1) actuates the aforementioned master cylinder in the normal manner. A spring 92 yieldably urges the piston 88 to the right viewing FIG. 1, thereby releasing the brakes of the vehicle.

Actuation of the booster is accomplished by actuating mechanism generally indicated by the numeral 94. Actuating mechanism 94 includes an operator-actuated input rod 96, one end of which is connected to the conventional brake pedal (not shown) mounted in the vehicle's operator's compartment, and the other end of which is slidably received in a blind bore 98 provided within the piston 88. First pivot means 100 connect one end of lever means 102 with a bracket 104 carried by the piston 88. Second pivot means 106 connect the opposite end of the lever means 102 with the spool valve 28. Third pivot means 108 interconnect the lever means 102 with a bracket 110 which is slidably mounted on the input rod 96. A spring 112 yieldably urges the bracket 110 into engagement with a stop member 114 and rigidly secures the actuating rod 96.

MODE OF OPERATION

The various components of the brake booster 10 are illustrated in the drawings in the positions which they assume when the brakes of the vehicle are released. In this position, the spool valve 28 is disposed so as to permit substantially uninhibited communication between the grooves 40 and 32 to thereby vent the pressure chamber 16 to the aforementioned reservoir (not shown) through the exhaust port 26. Also, substantially uninhibited fluid communication is permitted between the grooves 30 and 34 so that unhindered fluid communication is permitted between the inlet port 18 and the outlet port 22. Furthermore, the pressure level in the chambers 66 and 72 are substantially equal to one another and to the reservoir pressure, since communication through the orifice 74 permits pressure equalization. When a brake application is effected, actuating rod 96 is moved to the left viewing FIG. 1, thereby pivoting the lever means 102 about the pivot 100 to thereby urge the spool valve 28 to the left (viewing FIG. 1). As the spool valve shifts from the brake release position, the land 36 laps with the land 44 to thereby terminate communication from the pressure chamber 16 to the exhaust port 26. At the same time, a flow-restricting orifice is defined between the lands 34 and 42 thereby restricting fluid communication between the grooves 30 and 38 to increase the fluid pressure level in the groove 30. Also, at this time the land 36 moves away from the land 42 to communicate the fluid pressure level in the groove 30 to the groove 40, and therefore, into the pressure chamber 16 through the passage means 46. This higher fluid pressure level in the pressure chamber 16 acts upon the right hand end of the piston 88 to urge the latter to the left, thereby actuating the aforementioned master cylinder in the normal manner. When the brakes are subsequently released, springs 92 and 60 yieldably urge the piston 88 and valve 28, respectively, to the brake release positions.

As described hereinabove, the pressure level communicated into the pressure chamber 16 is also communicated through the passage means 78. However, engagement of the sphere 82 with the valve seat 84 prevents communication into the pressure chamber 72 until sufficient fluid pressure is developed in the pressure chamber 16 to urge the sphere 82 away from the valve seat 84. When this occurs, the fluid pressure level communicated into the pressure chamber 16 is also communicated into the pressure chamber 72. Therefore, a differential pressure acts across the piston 54 urging the latter to the right viewing FIG. 1. The magnitude of this pressure differential is determined by the pressure drop across the orifice 86, since the chamber 66 is always vented to the aforementioned reservoir. The pressure differential is sufficient to overcome the force of the spring 60, thereby urging the retainer 58 against the end of the spool valve 28 to prevent further movement of the latter to the left viewing FIG. 1. This limits the pressure level communicated into the pressure chamber 16, since the size of the orifice defined between the grooves 30 and 34 may not be further reduced after the retainer 58 engages the end of the spool valve 28. As is well known to those skilled in the art, the pressure level developed in the groove 30, and therefore the pressure level developed in the pressure chamber 16, is inversely proportional to the size of the flow restricting orifice between the grooves 30 and 34, so that by limiting movement of the spool valve 28, the size of the orifice and therefore the pressure drop thereacross is limited. It will also be noted that the pressure limiting device is completely passive during operation of the booster below the maximum pressure level, since the spring 80 is of a size so that the valve means 78 will open only when the pressure communicated into the pressure chamber 16 attains the maximum permitted value. When the brakes are released, or when the pressure level in the chamber 16 drops below the maximum value, the valve 78 recloses, thereby terminating fluid communication into the chamber 72. The high pressure level in the chamber 72 bleeds to return through the orifice 86, thereby permitting the spring 60 to slowly return the piston 54 to the position illustrated in the drawings.

When a malfunction prevents communication of fluid into the pressure chamber 16, the brakes may still be actuated manually. When this occurs, the increased actuating force required of the vehicle operator moves the actuating rod 96 relative to the bracket 110, thereby collapsing the spring 112. The end of the rod 96 engages the end of the blind bore 98, thereby providing a direct mechanical link between the brake pedal and the vehicle's master cylinder so that the brakes may be actuated in a conventional manner.

I claim:
1. In a hydraulic brake booster:
a housing defining a pressure chamber therewithin;
first piston means slidably mounted in said pressure chamber;
operator-operated valve means slidably mounted in said housing and shiftable from a brake release position to admit successively higher fluid pressure levels into said pressure chamber; and
pressure limiting means blocking further movement of said valve means when the fluid pressure level communicated into said pressure chamber attains a predetermined value;

said pressure limiting means including second piston means slidable in said housing and defining first and second chambers between opposite ends of the second piston means and the walls of the housing, said first chamber being vented to a fluid reservoir, conduit means communicating at least a portion of the pressure communicated to said pressure chamber into the second chamber when the pressure level communicated to the pressure chamber attains said predetermined value, resilient means yieldably urging said second piston means away from said valve means, said second piston means shifting into engagement with said valve means to prevent further movement of the latter when the pressure level in said second chamber attains said predetermined value.

2. The invention of claim 1:

said conduit means communicating said second chamber to said pressure chamber.

3. The invention of claim 1; and a flow restricting orifice extending through said second piston means to permit limited communication from said second chamber into said first chamber.

4. The invention of claim 1; and valve means in said conduit means preventing communication through the latter until the fluid pressure level communicated to said pressure chamber attains said predetermined level and thereafter communicating at least a portion of the fluid pressure level communicated to said pressure chamber into said second chamber.

5. The invention of claim 1:

said housing having an inlet port communicated to a fluid pressure source, an outlet port, and an exhaust port communicated to a fluid reservoir;

said valve means controlling fluid communication between said ports and said pressure chamber;

said first chamber being communicated to said exhaust port.

6. The invention of claim 5:

a bore defined within said housing communicating with said ports and with said pressure chamber;

said second piston means being mounted in one end of said bore;

said valve means being a spool valve slidably mounted in said bore and being shiftable toward said second piston means from said brake release position to communicate increasing fluid pressure levels into said pressure chamber;

said second piston means engaging one end of said spool valve to prevent further movement of the latter when the fluid pressure level communicated into said pressure chamber attains said predetermined value.

7. The invention of claim 6; and a partition in said bore between said one end of said spool valve and said second piston means;

said second piston means including means extending through said partition for engagement with said valve means;

said partition cooperating with said one end of said spool valve to define a cavity therebetween;

said first chamber being defined between said partition and said second piston means;

said spool valve defining passage means therewithin communicating said cavity with said pressure chamber.

8. The invention of claim 7:

said conduit means communicating said cavity with said second chamber; and valve means in said conduit means preventing communication through the latter until the fluid pressure level in said cavity attains a predetermined level and thereafter communicating at least a portion of the fluid pressure level in said cavity to said second chamber.

9. The invention of claim 1:

said conduit means communicating said pressure chamber with said second chamber; and valve means in said conduit means preventing communication through the latter until the fluid pressure level in said pressure chamber attains a predetermined level and thereafter communicating at least a portion of the fluid pressure level in said pressure chamber to said second chamber.

* * * * *